(12) United States Patent
Glaser (10) Patent No.: US 10,621,318 B1
(45) Date of Patent: Apr. 14, 2020

(54) OPERATING SYSTEMS, SOFTWARE, APPLICATIONS (APPS) AND SERVICES FOR RECEIVING, PROCESSING AND STORING A PLURALITY OF COMMANDS BEARING BIOMETRIC INPUTS

(71) Applicant: Lawrence F. Glaser, Windermere, FL (US)

(72) Inventor: Lawrence F. Glaser, Windermere, FL (US)

( * ) Notice: Subject to any disclaimer, the term of this patent is extended or adjusted under 35 U.S.C. 154(b) by 63 days.

(21) Appl. No.: 15/726,226

(22) Filed: Oct. 5, 2017

Related U.S. Application Data (60) Provisional application No. 62/404,463, filed on Oct. 5, 2016.

(51) Int. Cl.
| | |
|---|---|
| G06F 21/32 | (2013.01) |
| G06Q 20/34 | (2012.01) |
| H04W 4/029 | (2018.01) |
| H04W 4/02 | (2018.01) |
| G06Q 20/38 | (2012.01) |
| G06K 9/00 | (2006.01) |

(52) U.S. Cl.
CPC ......... *G06F 21/32* (2013.01); *G06K 9/00033* (2013.01); *G06Q 20/341* (2013.01); *G06Q 20/38215* (2013.01); *H04W 4/02* (2013.01); *H04W 4/029* (2018.02)

(58) Field of Classification Search
CPC ...... G06F 21/32; G06F 3/0425; H04W 4/029; H04W 4/02; G06K 9/00033; G06K 9/0004; G06K 7/10; G06Q 20/341; G06Q 20/38215
See application file for complete search history.

(56) References Cited

U.S. PATENT DOCUMENTS

| | | |
|---|---|---|
| 9,065,893 B2 | 6/2015 | Glaser |
| 9,122,966 B2 | 9/2015 | Glaser |
| 9,489,609 B2 | 11/2016 | Glaser |
| (Continued) | | |

FOREIGN PATENT DOCUMENTS

WO   WO-9008366 A1 *  7/1990  ........... A61B 5/1171

*Primary Examiner* — Sher A Khan
(74) *Attorney, Agent, or Firm* — Leslie R.J. Virany (57) ABSTRACT

Systems and devices generating biometrics associated with events triggered by actions of a users are disclosed, improving security, trust factors, functionality and automation potential. In accordance with the invention, redesign of operating systems, software, storage, medium formatting, applications (apps) and services, busses, compilers and chips smoothly incorporate biometrics, implying changes to software, internal chip machine code/internal operating system, storage medium, applications, communications structure and formatting and services. Improvements extend to private and public networks, cloud computing and potentially the networks' least common denominator elements. A wholly electronic trusted commerce solution is envisaged, taking advantage of electronic currency such as a bit coin, uniquely identified paper money combined with electronics and NFC or RFID variable wireless capabilities. Improvements also extent to forensic analysis for law enforcement and government. Features and routing priorities can be tailored in a network to regulate flow of biometrically marked with respect to other data.

16 Claims, 6 Drawing Sheets

(56) References Cited

U.S. PATENT DOCUMENTS

| | | | |
|---|---|---|---|
| 9,823,781 B2* | 11/2017 | Ludwig | H03K 17/96 |
| 9,904,886 B2 | 2/2018 | Glaser | |
| 10,127,486 B2 | 11/2018 | Glaser | |
| 2002/0006217 A1* | 1/2002 | Rubbert | A61C 7/00 |
| | | | 382/131 |
| 2003/0128867 A1* | 7/2003 | Bennett | G06K 9/00 |
| | | | 382/115 |
| 2005/0007517 A1* | 1/2005 | Anandan | G02F 1/133603 |
| | | | 349/69 |
| 2006/0029296 A1* | 2/2006 | King | H04N 1/00244 |
| | | | 382/313 |
| 2007/0000778 A1* | 1/2007 | Hsiung | G01N 27/4148 |
| | | | 204/419 |
| 2008/0056539 A1* | 3/2008 | Sweeney | G06K 9/00033 |
| | | | 382/115 |
| 2008/0059578 A1* | 3/2008 | Albertson | G06F 3/016 |
| | | | 709/204 |
| 2008/0166028 A1* | 7/2008 | Turek | G06K 9/0002 |
| | | | 382/124 |
| 2008/0230498 A1* | 9/2008 | Valmore | F16M 13/00 |
| | | | 211/26.1 |
| 2010/0066697 A1* | 3/2010 | Jacomet | G06F 3/0414 |
| | | | 345/173 |
| 2010/0165090 A1* | 7/2010 | Sweeney | G06K 9/00033 |
| | | | 348/77 |
| 2012/0007821 A1* | 1/2012 | Zaliva | G06F 3/03547 |
| | | | 345/173 |
| 2013/0090939 A1* | 4/2013 | Robinson | G06Q 50/22 |
| | | | 705/2 |
| 2014/0129843 A1* | 5/2014 | Shi | G06F 21/32 |
| | | | 713/182 |
| 2014/0183269 A1* | 7/2014 | Glaser | G06F 21/32 |
| | | | 235/492 |
| 2014/0218327 A1* | 8/2014 | Shi | G06F 3/041 |
| | | | 345/174 |
| 2016/0232517 A1* | 8/2016 | Gardiner | G06K 9/00087 |
| 2016/0232533 A1 | 8/2016 | Glaser | |
| 2016/0269400 A1 | 9/2016 | Glaser | |

* cited by examiner

OPERATING SYSTEMS, SOFTWARE, APPLICATIONS (APPS) AND SERVICES FOR RECEIVING, PROCESSING AND STORING A PLURALITY OF COMMANDS BEARING BIOMETRIC INPUTS

CROSS-REFERENCE TO RELATED APPLICATIONS

This application relates U.S. patent application Ser. No. 14/201,823, now U.S. Pat. No. 9,122,966, filed on Mar. 8, 2014, which is a continuation-in-part of U.S. patent application Ser. No. 14/021,772 filed on Sep. 9, 2013, now U.S. Pat. No. 9,065,893, which claims the benefit of Provisional Application Ser. No. 61/698,529, filed Sep. 7, 2012. This application further relates to U.S. patent application Ser. No. 14/979,447 filed Dec. 27, 2015, U.S. patent application Ser. No. 15/016,824 filed Feb. 5, 2016, and U.S. patent application Ser. No. 14/996,290 filed Jan. 15, 2016. The contents of each patent and patent application identified above are incorporated herein by reference in their entirety for purposes of essential subject matter.

TECHNICAL FIELD

The technical field relates to electronic devices, and more specifically to portable electronic devices that can perform identification, secure transactions, and other user-oriented services, all communications species plus associated networks and hardware forming complete systems, networks and cloud computing and storing solutions. The affected field ranges from stationary microprocessor controlled devices, completely virtual computers which function as part of a cloud to which users merely interface to and receive output (from the cloud), to servers, vehicles, watches, advanced contact lenses, optical devices such as telescope, microscope, military apparatus, control stations, flight monitors, 911 center consoles, power station controls, virtual reality goggles, kiosk screens, media walls, holographic logic, anywhere and everywhere computing is put to use and greater security and accountability are required or desired. The technology also reaches into simplistic sensors, arrays of sensors, near field communications devices and RFID devices which may not have a local microprocessor. This implies deep involvement with IoT and WoT (Internet of Things/World of Things) development. Equally, these improvements set the stage for a trusted, utterly secure monetary exchange system vastly superior to any system in use today.

BACKGROUND

Magnetic cards have many purposes. Examples include credit cards, debit cards, medical and insurance cards, drug payment cards, health care service cards, stored value cards, identification cards, access entry cards, and the like. Many of these cards have information stored in a magnetic stripe, for provision to communicate with a POS (Point of Sale) system. Many useful conversions to a card format are possible, including licenses, permits, ez-pass, security and many other potential variations on the general theme.

At the same time, portable user devices such as smart mobile phones and wireless computers, offer a wide variety of information and communication capabilities to the user. Some portable user devices augment the use of magnetic cards by allowing, for example, the modification of information in the magnetic strip of the cards. There are also mobile devices which interface to magnetic stripe readers through the use of a card slot. Additionally, there are card readers that are completely internal to a secure facade, such as that typically found at an ATM (automated teller machine). Many competing methods have been proposed to collapse or contain multiple cards into one card.

The operating systems, software, services and applications of today have not been streamlined to accept biometrics for more than a verification step for payment, or initial logging. Processing a multi-biometric for each keystroke may tax a system 200 to 10000 fold.

SUMMARY

Previously, in U.S. Pat. No. 9,065,893 issued to the present inventor, the specification introduced the concept of housing all cards and services one utilizes into one single card and for safety and convenience, a host device to the card is selected and paired, such as a cell phone. The previous specifications made it clear, other devices such as wearables (watch), tablets and the like, were equally included as possible hosts or surrogates and two or more surrogates could be interlinked. It was also clearly specified that one device could totally control another, such as when a device loses its display and a paired device could allow full control or partial control over the paired device which has no display or a damaged display. No limitation was expressed then or now. Even an advanced contact lens leveraging this technology could be linked to the card, to the cell phone, to the tablet, in any combination, to increase availability and protect from the loss or damage to any one device or to be certain one can access each device.

It is noted digital signal processing (dsp) was incorporated previously in the specifications to detect touch. Nothing herein or previously disclosed, limits the placement of a touch sensing technology that utilizes pressure sensitive or electronic active layers over the pixel stacks of this invention.

However, the invention U.S. Pat. No. 9,065,893, in and of itself, was intended to detect touch by examining in real time, the deformation of the object, such as a finger, touching the final, outermost surface, which was previously described in most cases to be a benign protector layer. In embodiments, the protective layer provides a dual purpose in also providing signal guidance. In embodiments, the protective layer changes its light deflection sufficient to allow dsp (digital signal processing) to detect the pressure of the finger depressing a given region. In further embodiments, the degree to which the finger-tip deforms can be interpreted to represent pressure, which act as a haptic control. Further, movement of the finger-tip such as drag and press harder, touch and trace a circle, touch and trace a square, touch and trace a triangle, touch and twist, is intended to represent a potential control which passes multi-biometrics with each action. The prior disclosure went as far as to suggest gestural languages developed from the capabilities of these surfaces. This design, in more preferred embodiments, suggests taking all active electronics from the surface to improve reliability and resistance to dirt or liquid presence while preserving touch and gesture function, drag, drop and pressure sensitivity. It is interesting to note, this may be the sole invention to propose a touchless and touch sensitive surface that does not detect touch using any form of active electronics or pressure sensitivity at the surface.

U.S. Pat. No. 9,065,893 made it abundantly clear that the use of biometrics to lock up and protect access to and use of these cards and services was one of the features of the invention series. Use without certainty of the identity of the user, regardless of logging (knowing a passcode or pattern) and certainty electronically gathered proof that the biometric was entered by a living target was and is mandatory with this invention. As the series evolved, following the original specification which is noted to be a pre AIA specification, features were recognized which allow for the switching of services or "cards" the devices host, to be controlled by the user and can also be set for automatic use in various user settings, or through the use of algorithms including artificial intelligence. Biometrics for each action taken by a user, and also the use of a static grasp as a command, which also includes biometrics, are recognized as a feature. The mandate for a biometric for each action the user takes was previously recognized as a feature, as well as passing the capture of a biometric co-associated with each action the user takes, to internal memory of the local device, other paired devices or outside the device to and through networks (eg metadata streams), to clouds and other places where processing and security as well as storage of data is required.

The series U.S. Pat. No. 9,065,893 et. al., introduces the novelty of capturing a biometric for each action the user takes which includes touch, or gesture at distance. Multi-biometrics were also included in this series, and the definition per the specification is a biometric captured at a known region and during a known moment in time, which may include data about the known location of the device (gps or wifi assisted) and known location for other devices, which also may include a second biometric co-associated with any first biometric (multi-biometric, by definition in this specification and in previous specifications). One of the extreme capabilities of this Patented series of hardware is its unique ability to gather data generated by more than ambient lighting of a location on the surface or near the surface by emitting multiple different emissions of light or lower and higher signals throughout the complete known range of electro-magnetic emission (or beyond, such as VHF, UHF and beyond), to then collect the reflected signal in differing layers and stack components forming a pixel of the invention or an array of pixels of the invention. In simple terms, one can capture the finger print, capillary pattern which is aligned with the finger print, other features of the region not associated with the finger print or capillary pattern and underlying bone structure in a single pass, a single "clock cycle" or "layer cycle" forming a highly complex pattern which is referenced as a multi-biometric. The stacked pixel display/imaging device of major embodiments of the present invention typically alternates emitter pixel layers with receiver pixel layers, so a "layer cycle," for purposes of this document, refers to a cycle in which one layer is addressed by the processor. Industry calls the capture of two biometrics from the same subject, a multi-biometric. This invention series argues it is far more secure to capture two or more correlated biometrics at the same moment, from the same region on a single device. In part, that is what this invention series accomplishes. It is notable that the inventor intended the spectral analysis, the kirlean still or video analysis of a target which will provide "living versus dead" data and chemical analysis (via spectral analysis) for the target. Further, increasing the sensitivity of the components in the stacks, individual pixels tuned to human nervous system signaling will detect stress, another useful biometric to co-associate with all other biometrics and be able thereafter to act upon or at least record. Knowing the location of the device and other devices in proximity to the device capturing the biometrics adds to the certainty, security and trust factors of the metadata stream or any operating system, software, application or service the device will thereafter utilize in conjunction with the use of the device and its subsequent event generation. Hence it is noted that for this invention series, Multi-Biometric carries different, more secure, more trusted methods of identification of who triggered what event, made what entry, performed what gesture, when, where, how and why. Taken to its extreme meaning and use, the age is upon mankind where anonymous computing or communications and its' associated risk, can be mitigated. Clearly, this invention is intended to apply to any computation, any device which computes or feeds, receives, stores, processes, searches, networks, passes, shares or compares data, taken in more preferred embodiments where the demand for this becomes mandatory (viral).

Sensors, in the form of stacked pixels, were previously disclosed in U.S. Pat. No. 9,065,893. Limits as to sensor species formed in a single pixel were never expressed or intended. The pixel of this invention is typically a stack, if one views from above the stack down the center of the stack. In an embodiment, a single pixel is created in its own single layer stack, so long as it works with other actual stacked pixels, it would still be operating in the spirit of this invention. The stack concept is supported by the basic knowledge that the top layers, doped to perform functions such as PNP or NPN, PN, NP etc. . . . do not impede other signals passing entirely through the pixel, hence a second, third or plurality of pixels may be stacked. Independent timing of the firing of each pixel was previously covered and included drawings to show the timing. Each pixel and pixel layer being independently controllable, was expressed previously. This means a pixel, a pixel in a stack, a whole layer traversing many stacks or just individual pixels wherever they are placed either on top of a stack or within a stack. Offsets in the pixel shapes were drawn and disclosed, as well as described either in the form of the shape of the stack, or pixels found in the stack. For clarity, included here is what the inventor believes was obvious at the time of U.S. Pat. No. 9,065,893's initial creation, incorporating the use of capacitive emission, capacitive collection, proximity detection, radio wave emission, radio wave detection, inductive emission and inductive detection, which may be included in any pixel position, in a stack or outside of a stack. In embodiments, grouping sensors in a given stack, such as putting capacitive, inductive and optical sensors in each stack, allows the operating system and software, applications and services to output more than one emission species to then query more than one input species, to assure detection of an external event. Detection of the swiping of a card in a legacy card slot is a good example. Capacitive sensors are prone to noise, the charge of the user (standing on dry nylon carpet in winter) and are known to make capacitive reading problematic and at times unreliable, such as was abandoned in copy and scanning machines which generate electrostatic interference. Optical was broadly incorporated as a sensing species and by far, outperformed capacitive or inductive sensing. However, ganging the sensors will have merit in certain settings, particularly where interference in a specific species of sensing is present in the environment. If multiple species, such as optical and inductive sensing are deployed in a stack and both species indicate a positive event, the reliability of event detection is logically increased. When the sensors do not agree, engineers may examine why and determine why there was disagreement, thus improving, such as to change from inductive and optical sensing to capacitive and optical sensing in that stack, for that specific form of sensing, or to combine more than two species of emission and detection to more accurately determine external events.

There is a need to remake operating systems, software, services and applications, as well as all hardware and network architecture(s) to leverage and utilize the potential to receive more biometrics and multi-biometrics in the full metadata stream emitted by a device, be it wired to a network or wire based. Even a stand-alone device is still affected, such as a PC or Server. This does not mandate changing the standards for transmission, such as 4G or emerging 5G, Ethernet, 1000 base T and so on, however, it may suggest some changes to standards in terms of bandwidth utilization and allocation, as one non-limiting example. Output with biometrics will reach a device which is part of a network, or, the owner of the stand-alone device will still recognize features from the biometric and multi-biometric capabilities of this invention which become mandatory in the eyes of the owner or stake holder. The need is great and the time is right to introduce the concept of biometric and multi-biometric dependent systems which may mandate the presence of a biometric or multi-biometric with each keystroke, each action a user takes. Going deeper, this mandate may apply to the data streams in and out, to the least common denominator piece of electronics in a pathway and to the internal chips found within a device, as will be further explained below. This thinking can go deeper still, into compiler technology, wherein, each keystroke or action taken by a software writer is recorded forever as part of the decompiled and compiled products the compiler can produce. Further, the novel concept of placing a display on each major chip in a system so the chip can be addressed by known users and accessed internally, is introduced in this document. Previously, this was referenced as "dark processing," in other words, as described in the above-incorporated references, VVLSI circuitry from which query functions have been removed, allowing the circuitry to take in and process data and so on, but with troubleshooting and inquiry functions, for example, removed at the factory. The idea is to make systems where every data element and tangible element is accountable, subject to deep and meaningful forensic query. Remember, co-associated in one holistic data stream representing an event with a beginning, an ending, and one or more unique user's involved will be found biometric data for each keystroke and other data co-associated with these data. The forensic "query of the future" will root out evil doers, fraud, personal identity theft, and will deeply enhance the ability to track drug and human traffic (ers) to name some non-limiting examples of frauds and evil doing which can be better addressed with this invention's feature content. All of this content is automatic, the features, functions, biometric gathering, with respect to the users of these systems, software and network managers. No extra effort is required as compared to what users do now with their equipment, networks and day to day management. In return, it is believed any extra cost will be eliminated, at a minimum, by the automation applicable to commerce. Time efficiency, trust built into the entire system, will further improve the value and offset costs.

The novel idea is proposed for using the biometric data and multi-biometric data in a metadata stream to glean useful information from point of transmission to the point of reception (and storage), meaning, all components making up a network in between the emission point (first transmission) and the end point (final destination of a transmission). This creates a new age of computing that allows each metadata stream to receive different treatment based on the biometric assured identity of the sender, or of the recipient and may expand to include location data, unique machine identity and other data in combination with the biometric from which automated features can activate and deactivate. Included in this stream are unique identifiers for components of the device performing the transmission and these data too, may be gleaned and acted upon or stored. Many extremely useful and valuable possibilities are opened up with this new series of inventions. Clearly, there is a need to tailor the operating systems, software, services and applications as well as certain hardware and networks, to further optimize this opportunity. Below, I will discuss combining capture of a multi-biometric with every action of the user, wherein the action they have taken, if and when it translates to a piece of data that normally relates to a tangible character, such as "L", will result in the L being embedded within the biometric, using encryption or otherwise, such that it may be extracted when received if the far end is familiar with the multibiometric of the user. This advancement distributes intrusion, fraud, identity theft detection to all points in a network and allows for the earliest possible detection of these kinds of detections.

A previous disclosure (U.S. Pat. No. 9,065,893) provides a device comprising a substrate and a plurality of pixel stacks. The substrate has a plurality of sides, and the plurality of pixel stacks are positioned on at least one of the plurality of sides. Each pixel stack of the plurality of pixel stacks includes a plurality of pixel elements overlapping in a direction transverse to the substrate. The plurality of pixel elements includes at least two input pixel elements, and each input pixel element is configured to receive a different type of biometric input. At least one type of biometric input passes entirely through at least one input pixel element to reach another input pixel element.

Previous disclosure also provides a system comprising a substrate, a processor positioned on the substrate, a plurality of input layers, and a non-transitory memory positioned on the substrate. The substrate has a substrate having a plurality of sides, and the plurality of input layers are positioned on at least one of the plurality of sides and are overlapping in a longitudinal direction in an elevation view of the at least one of the plurality of sides and the plurality of input layers. The overlapping input layers are configured to receive multi-biometric inputs, the multi-biometric inputs including a plurality of different types of biometric inputs, and each input layer of the plurality of input layers is configured to receive one of the different types of biometric inputs. At least one biometric input of the multi-biometric inputs passes entirely through at least one of the plurality of overlapping input layers. The multi-biometric inputs are stored in the non-transitory memory, and each biometric input of the multi-biometric inputs is analyzed by the processor.

This new disclosure focuses on optimizing the operating system, software, services and applications such fully biometric capable devices host, inclusive of the idea of generating a biometric for every action, every keystroke a user may execute, the subsequent storage and retrieval challenges, metadata emissions receipt of metadata bearing biometrics for each least common denominator action made by the user. The presence of Multibiometrics with each command or step a user takes, is not a familiar event for pre-existing operating systems, software apps and services. As such, a tailoring of how the data stream is examined, compressed, expanded, transmitted, received, stored, retrieved (and more) must take place within each identifiable component in the overall system. This also suggests changes to the Cloud if it is involved in any communication or transaction.

Further disclosure is made regarding storage systems, routing, automation of new features applicable to the gleaning of the biometric data or the biometric data and other associated data with the biometric, to, for example, increase network bandwidth, quality of service or more and then, remove the additions when it's evident the transmission is over or does not any longer require the enhancement. Disclosure regarding using this invention for software writers and compilers is taken on in a non-limiting manner. The concept is suggested to allow access to protected code buried in semiconductor chips through adding pixel stacks to the surface of the chips and mandating biometric ownership over the loading of the chip (portions of content in the chip which may not apply to a public portion of the chip's content) The public portions are subject to such things as externally controlled automatic updates. The protected portions require hands-on attendance to update or peruse, inclusive of biometric confirmed access.

BRIEF DESCRIPTION OF THE DRAWINGS

FIG. 1 is a block diagram of the operating system and its new functional requirements. Elements are defined as a biometrically enabled operating system 100, Input Output device capable of capturing biometrics for each action taken by a user across a substantial surface representing at least a qwerty keyboard as previously defined in the related specifications 101, another biometric capture capable device 102, another instance of a biometric capture capable device 103, additional electronics which may or may not be biometric gathering such as rfid, nfc, external or internal storage 104, wireless and wire based network interfaces not limited to a single instance of each 105, at least one transient memory which must contain the added data inclusive of biometrics 106, at least one non-transient memory which must contain the added data inclusive of biometrics 107, communications between element 101 and the OS 111, communications between element 102 and the OS 112, communications between element 103 and the OS 113, communications between element 104 and the OS 114, communications between element 105 and the OS 115, communications between element 106 and the OS 116, communications between element 107 and the OS 117, the potential for a DMA bus between memory or storage elements not limited to RAM, inclusive of any other storage medium 118, wired network pathway not limited to just one 119, and wireless network not limited to one 120.

FIG. 5 is a block diagram of a typical network, accessible to a biometric capable device with the new aforementioned functional requirements. The internet 500, a private network 501, a cloud partially accessible through the internet 502, a cellular network 503 and a PSTN 504 (Public Switched Telephone Network, or central office network) are shown. The drawings for various network topologies are limitless and as such, the inventor suggests no limitations as to how many of each network may be drawn and utilized, the overlap or lack of overlap, communications pathways and routing and the like. These elements are all greatly multi-variable, but the invention, performing within, represents new requirements and new features that improve the safety and trust factors, as well as forensic analysis of all possible events. Router 505 and router 506 (which may be advanced switches, routers, hubs, including fiber optic) are depicted to handle metadata streams that include biometrics for each keystroke. New embedded automated feature content is implied at these elements and any other element that can either act upon receipt of the data or allow, deny passage, report presence and copy pertinent details for reporting. A legacy magnetic card reader is shown 507. Smart cell phones are depicted at 508 a, b and c. Not shown are many wireless or wearable devices which, in an embodiment, is associated with 508 and utilize 508's cellular connection for long line communications while having their own self contained local communications capability which may include wifi, Bluetooth, nfc, rfid, proprietary wireless communications. A tablet is shown which may have its various communications paired with other devices (not shown) 509. A laptop is shown which is hard wire attached to a data switch 512 which is in turn attached to a wireless WiFi router (local) 511 (attached means operably attached utilizing known standards for communications, overlaying upon these connectivity the biometric and multi-biometric data). Communications connections between private network 501 and router 505 are labeled 520, communications connections between the Internet 500 and router 505 are labeled 521, communications connections between the cloud 502 and router 505 are labeled 522, communications connections between the PSTN 504 and a legacy card reader 507 are labeled 523, communications connections between data switch 512 and router 505 are labeled 524, communications connections between laptop 510 and data switch 512 are labeled 525, router 506 has three available attachments 526, 527, and 528. Server 532 is attached to router 506 by a pathway labeled 529. Server 531 is attached to router 506 by a pathway labeled 530. Servers 531 and 532 are operably attached to router 506 which is not attached to any element in this drawing. In a further embodiment, router 506 is attached to router 505 or independently to any other element in the drawing but these connections were omitted for clarity. Attachments may be copper, fiber or other formats. Wireless connections used to be avoided due to limited speed, but today's topology is finding use for wireless attachments between routers, switches and servers. Data switch 512 is connected to WiFi router with a hard pathway labeled 533. The WiFi router 511 is attached to the router 505 by a pathway labeled 534. The cellular network 503 is attached to the internet through pathway 535. The cellular network 503 is attached to the Cloud 502 through a pathway labeled 536. Connection and disconnection of highly specific connections, either permanent or temporary may require a multibiometric for that event and can require two or more multibiometrics. This hardens the connectivity portion.

FIG. 6 is a block diagram of a typical compiler, accessible to software writers with new functional requirements. Compiler 602 accepts source code from 601 over pathway 604 which has been developed and written with devices of this invention series 600, thus each keystroke or entry includes a biometric. Compiler 602 receives the source code through pathway 605 and generates executable programs 603 along pathway 606 which continue to bear the biometrics. The executable programs can be distributed through pathway 607.

Figure 1:
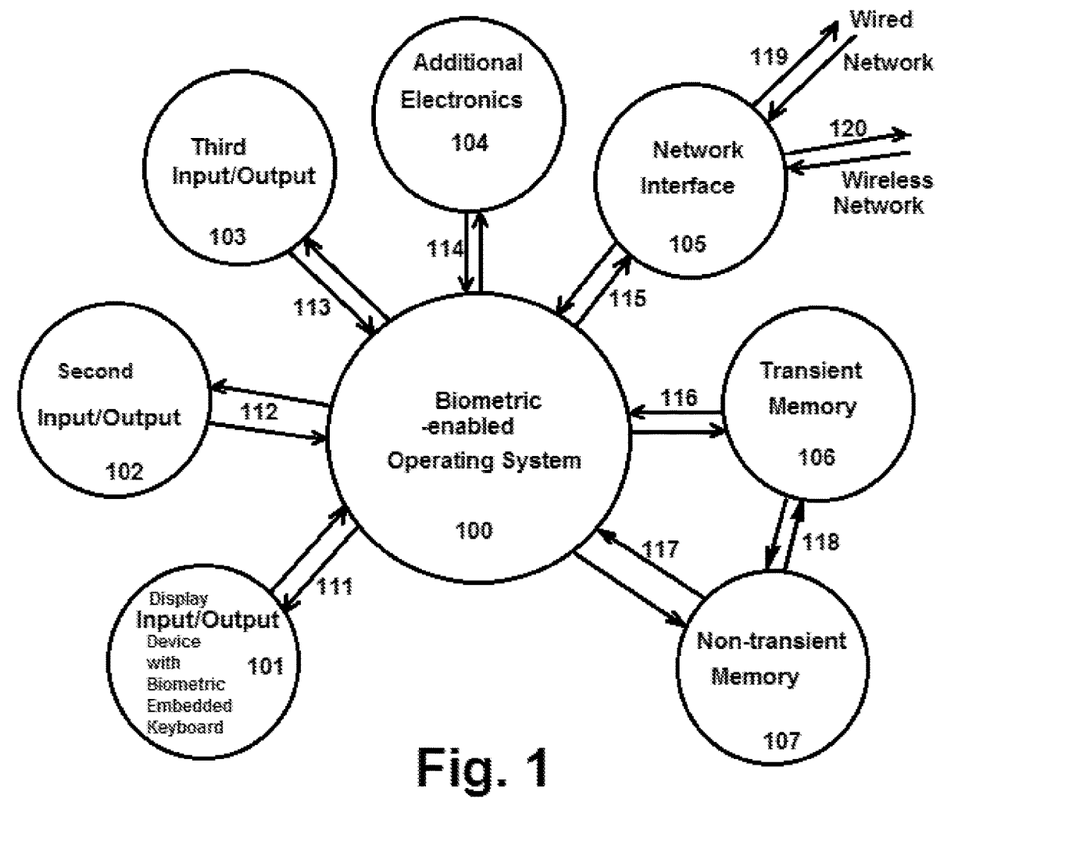

In an embodiment, the Operating Systems for devices of this invention are tailored to receive biometrics when a user makes so much as a static grasp (action) single keystroke (action) or gesture (action). This receipt of data may include further co-associated data such as multi-biometrics as defined in this specification, unique identifiers representing components of the system, the location of the device when the action took place and other devices in proximity including similar data from the other devices. This embodiment also applies to operating systems which are either remote to the devices of this invention or are hybrid operating systems operating in part or in whole within the device and outside the device. Also, within each chip or semiconductor in a given device, there may be layered operating systems. One such system usually present is assembler, a means to read binary data stored within a chip on power up, allowing the chip to transform from a down, inert mode to an operable mode ready to communicate to the outside world. In the world proposed here, biometrics and multibiometrics may have to reach these chips, be passed through and provide specific meaning to the chip in question. The chip will then have to interpret what to do in a myriad of infinite possibilities.

Figure 2:
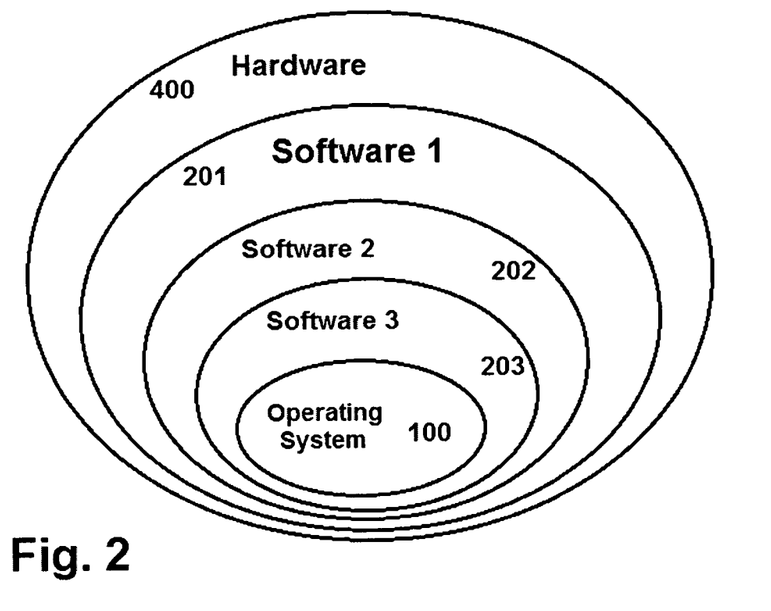
FIG. 2 is a block diagram of a typical software application and its new functional requirements. Within the hardware 400, presides the software instances which may relate to one another and share functions, or may act independently, software 201, software 202, software 203, all under the control of the operating system 100.

In an embodiment, the Software for devices of this invention are tailored to receive biometrics when a user makes so much as a static grasp (action) single keystroke (action) or gesture (action). This receipt of data may include further co-associated data such as multi-biometrics as defined in this specification, unique identifiers representing components of the system, the location of the device when the action took place and other devices in proximity including similar data from the other devices. This embodiment also applies to software which is either remote to the devices of this invention or are hybrid software operating in part or in whole within the device and outside the device. One thing software can do, as well as operating systems, is to scale how likely the user holding the device is a specific user. This can include many factors such as how many multibiometrics are present, how they compare to historic data, other data which co-associates with the biometric, such as location of the device and more. Software dependent upon the presence of a unique individual just to update or self repair, just to start, may be of keen interest to improve cyber security.

Figure 3:
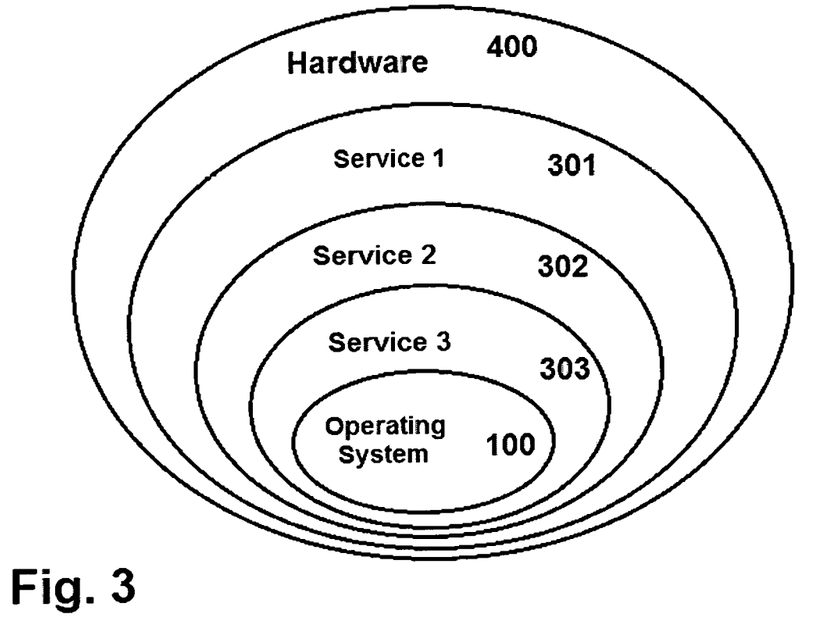
FIG. 3 is a block diagram of a typical service, embedded and accessible local on the device, remote, such as in a cloud, or a hybrid of both, with new functional requirements. Within the hardware 400, presides the service(s) instances which may relate to one another and share functions, or may act independently, service 301, service 302, service 303, all under the control of the operating system 100.

In an embodiment, the Services for devices of this invention are tailored to receive biometrics when a user makes so much as a static grasp (action) single keystroke (action) or gesture (action). This receipt of data may include further co-associated data such as multi-biometrics as defined in this specification, unique identifiers representing components of the system, the location of the device when the action took place and other devices in proximity including similar data from the other devices. This embodiment also applies to services which are either remote to the devices of this invention or are hybrid services operating in part or in whole within the device and outside the device.

Figure 4:
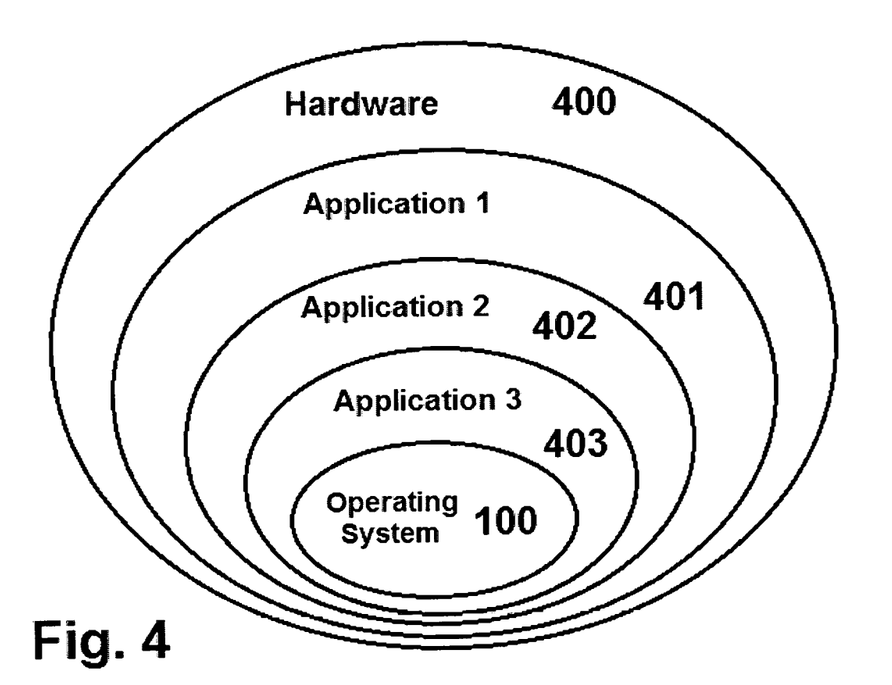
FIG. 4 is a block diagram of a typical application, embedded and accessible local on the device, remote, such as in a cloud, or a hybrid of both, with new functional requirements. Within the hardware 400, presides the application(s) instances which may relate to one another and share functions, or may act independently, application 401, application 402, application 403, all under the control of the operating system 100.

In an embodiment, the Applications for devices of this invention are tailored to receive biometrics when a user makes so much as a static grasp (action) single keystroke (action) or gesture (action). This receipt of data may include further co-associated data such as multi-biometrics as defined in this specification, unique identifiers representing components of the system, the location of the device when the action took place and other devices in proximity including similar data from the other devices. This embodiment also applies to Applications which are either remote to the devices of this invention or are hybrid Applications operating in part or in whole within the device and outside the device. Older applications could be automatically updated by advanced software to become applications which use and leverage all the data obtainable from the operating system and event data streams to expand the applications use or abilities.

Figure 5:
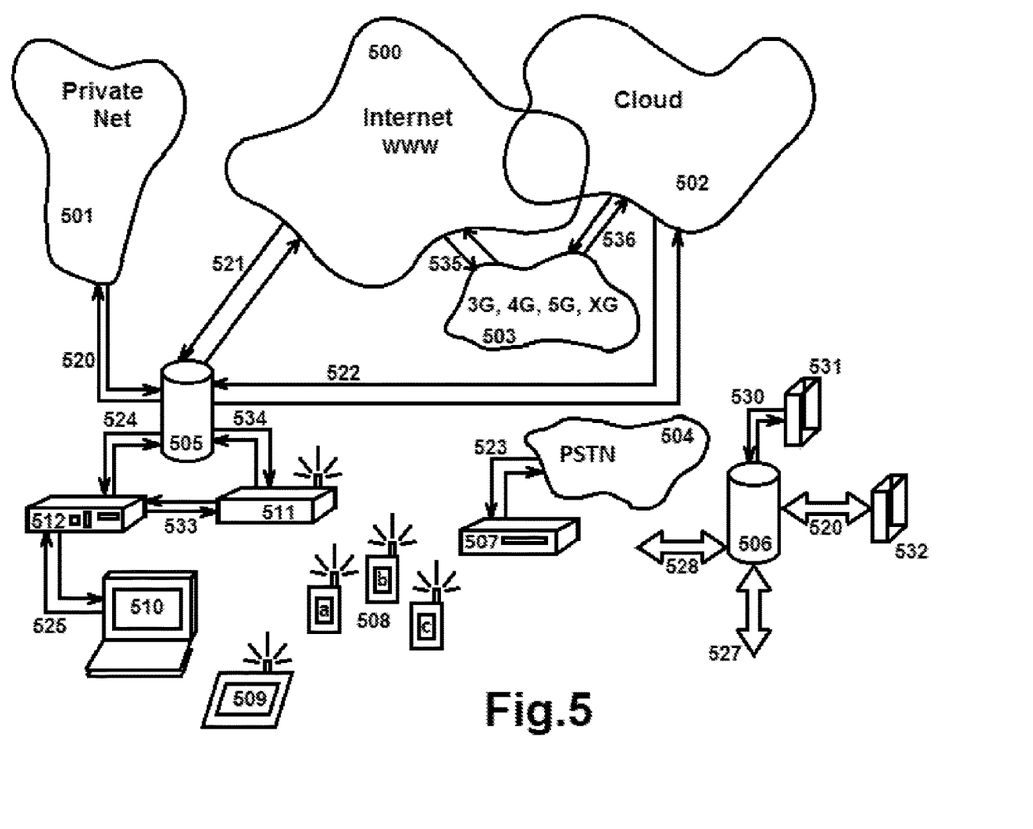

In an embodiment, the Networks for devices of this invention may be tailored to receive biometrics when a user makes so much as a static grasp (action) single keystroke (action) or gesture (action). An example would be to remotely track when user is present, or absent and auto log on a certain grasp, log out when the user no longer handles the device in x seconds. In an embodiment, the holster for the device has electronics in the holster to hold and then project biometrics for the user which tells this reporting service, a break in the normal series of events has happened. If the device can stay in communications with networks at all times, then there should be a distinct reason a unique user's biometrics disappear for any appreciable amount of time (eg theft of device, loss of device) Equally, in order to restore the device, perhaps a holster or dock has several biometrics which must be presented in a certain order to restore the device. No thief would have this extremely large file to then be able to play it back for the device, to the network, to allow restoration of the device. This receipt of data may include further co-associated data such as multi-biometrics as defined in this specification, unique identifiers representing components of the system, the location of the device when the action took place and other devices in proximity including similar data from the other devices all of which may be sent or not sent as determined by the operating system, software or applications running on the device. This embodiment also applies to networks which are either private, public, cloud Near Field Communications, any wired or wireless standard's based data stream or a proprietary data stream, wired or wireless.

Figure 6:
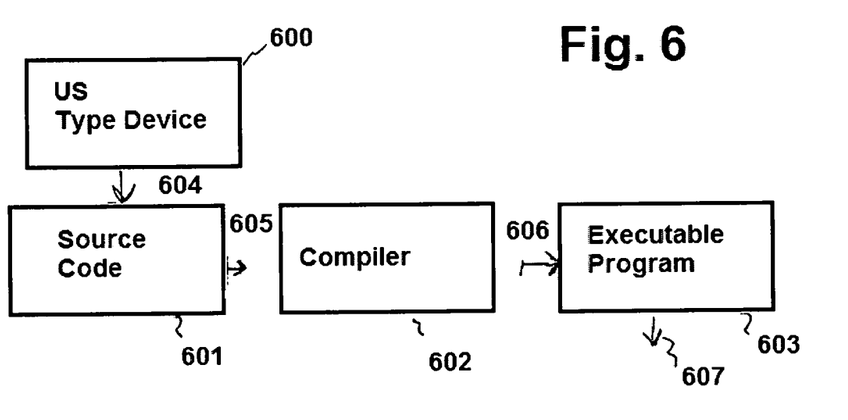

In an embodiment the Compiler adapted for use with this series of devices may be tailored to receive biometrics when a user makes so much as a static grasp (action) single keystroke (action) or gesture (action). This receipt of data may include further co-associated data such as multi-biometrics as defined in this specification, unique identifiers representing components of the system, the location of the device when the action took place and other devices in proximity including similar data from the other devices in proximity, all of which may be stored with the written code, character by character space by space, event by event. Every action the software writer takes may include this data. This embodiment may apply when the writer writes software remotely from the compiler or introduces written code which was first written in a non-compiler environment. An example is using a WORD format to write C++ which is perfectly acceptable, but in this instance, mandates the presence of biometrics and all other aforementioned data in identical manner.

Figure 7:
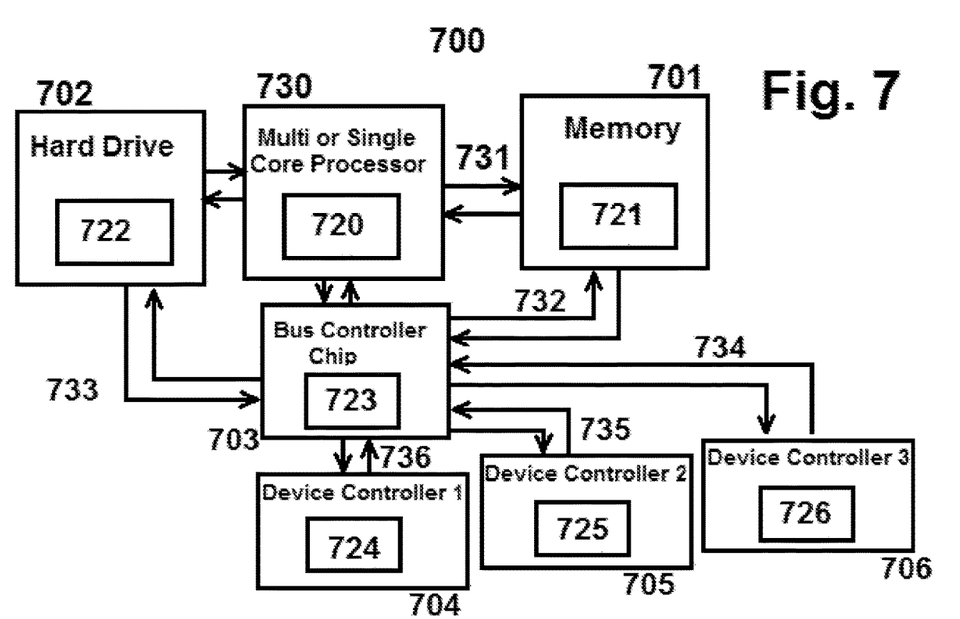
FIG. 7 is a block diagram of processing, memory, switching and any other chip, wherein a surface has been provided to allow biometric access to the internal vvlsi scale componentry of the chip, further allowing access to portions of the chip normally not accessible and subject to self-destruction should a hack or intrusion attempt be made. At the center is a processor 700 which interconnects to other chips including memory 701, hard drive 702 (which may be a chip or a genuine hard drive), a bus controller 703 and device controllers 704, 705 and 706. Each chip shown (or a hard drive or virtual drive) shows a new, novel and unique addition in the form of a pixel stack array depicted at 720, 721, 722, 723, 724, 725 and 726. Each relates to and controls its underlying chip. In an embodiment, one input region on a chip, such as 720, conceivably but optionally controls another chip, for example, should the region such as 721 become faulty or damaged. These regions on devices certainly apply to external hard drives, flash memories and other peripheral devices or chips. Bussing between chips is depicted as 730, 731, 732, 733, 734, 735 and 736.

In an embodiment Electronic Chips, Semiconductors with complex functions may be equipped with the previously patented invention (hardware) as a surface feature. Thereafter, to access certain portions or the whole of the chip's internal functions for purpose of rewriting hard coding, a biometric is required and any combination of the aforementioned data, to allow a rewrite and thwart false attempts to rewrite data in critical systems. Eg plant bots, infect a system, hack a system. To cut costs, perhaps this surface feature is not present or present in a very small matrix as compared to other devices used to build a system, or the device in which the chip will finally preside. So, as a boost to the idea of providing a very large, complex Multi-Biometric, specifically to each chip and specifically when prompted to present this data, a communications protocol, in an embodiment, is developed; chip, through device, to the device' larger display to permit modes where the chips themselves are activated for updates. In this manner, no outside force can access the core of these chips to alter their programming, hence, the system enjoys considerable hardening against hacking and public enemy manipulation.

In an embodiment, movement and storage components associated with these data, such as the network and bussing elements between sub-components, memory, transient and non-transient storage, hard drives, virtual drives, even cloud storage, must be redesigned to handle the co-associated multibiometric data. In so doing, each least common denominator component of a system can become more controlled, more trusted and not act as a portal for incursion or public enemy exploitation. Logically, this implies greater bandwidth, capacity and compression mechanisms to keep latency at bay and provide smooth performance, while upping the trust factor and tightening security.

In an embodiment, the operating system must remember where each event string has been stored and shared. Confirmation of biometric identity and each multi-bometric sub component which includes the "alive" feature, location, subcomponent unique identifier, other data from paired devices (surrogate) or other devices in locality when a transaction took place. This forms up the hardening factors which vastly increase security and trust.

In an embodiment, structurally, the larger data will be the biometrics according to their capture mechanism, which is image-based. Although the image can be compressed into a large number, still the carrying of these data species will greatly exceed the size of the event data, such as an ASCII keystroke. Image may also imply an image in a spectral or energy frequency human eyes or senses cannot detect. Accordingly, the Operating System may take advantage of out of band bussing to coordinate the data, cutting out the keystrokes from the biometrics and other data, and transporting the data along different busses. This can also include transport of any portion of the data in band, or out of band. In band could be, for example, along the communication busses for event data such as a keystroke, while stripped off biometrics travel on a DMA (Direct Memory Access) bus. No operating system known to this inventor performs such a task, in part, because no known operating system has had the burden of carrying massive data strings to enhance the security and performance of a system. Logically, one could say the performance will suffer, however, through creative manipulation of the data streams and recombination of a data stream performed when and as necessary, if latency is not present due to improved processor performance, bandwidth and bus width plus utilization of these enhancements, the net sum effect is to provide more data per each event, anywhere one choses to examine this solution. That means, the security is vastly improved, evil doers can be traced to the keystroke, when, where and how it was entered into any system or across any network. If by chance, the stakeholder (such as the US Government) mandates devices and networks of this type, aside from a successful hack and emulation of a data stream, which would get caught in an audit or a forensic investigation. Note that above the inventor calls for the operating system to recall where a data string has gone, where it has been shared. Hence, the Operating System can randomly or routinely audit. Data strings never audited, never claimed, may be hacked, falsified strings. Encryption techniques may be applied to any data at any stage to further harden the protections afforded by this solution. The biometric identity of the original program load into the main processing chip or network driver chips, memory chips, storage chips including all the chips in a local system or all the chips ever encountered by a data string, may be stored, remembered and queried.

In an embodiment, the Operating System and other operable software, apps, services, may self-examine data for correctness. Features that these data will carry include a unique identifier for each sub component of each system and will contain unique and biometric identifiers for chips involved in the data transportation, storage, creation or deletion. Correctness of data is important because a falsified string will have to be created by a human being who has very deeply studied the system, overcome all encryption(s), knows the unique identifiers and most interestingly, if a fake string is created, existing strings used and reused, stored and recalled, will be known to the operating system. As such, a new string structured in any manner as to look like an existing string may immediately sound alarms because in a test of the string's integrity, it will link back to nothing. This is why an operating system which leverages the enormity of carrying biometrics for every action, every keystroke, every gesture, becomes so meaningful in the grand scheme.

In an embodiment, bussing and the driving of internal busses, including to and from memory, storage, network and chip to chip may be optimized. This implies using existing standards and bussing but routing data more optimally for this environment, or, a manufacturer could customize the bussing and chips to vastly improve the speed at which data is created, moved, stored, shared and deleted.

In an embodiment, storage and recall may create more latency as the data strings are so much larger, 200-10,000 times larger than a plain ASC II data transport type system with no biometrics. As a side note, here again, other systems use a biometric to get past a security stop point, such as initial log in. This system and the whole of the invention propose to biometrically mark and link everything. Every action, every place the user has gone a queried local and remote devices down to NFC tags, RFID tags, device to device communications, file share, posting, communications of all forms, anywhere and everywhere data is moved, shared, stored, deleted and modified. Storage can be customized or better allocated to move the data more smoothly.

In an embodiment, to prepare and optimally size data for transmission external to a given device, there may be a benefit from use of abbreviated methods where the full bio set is held locally, sent with the data for some of the data (from, say, user X) where the recipient receives enough data to know every keystroke was confirmed user X and user X was alive. More data include, in embodiments, user X spectral analysis and nervous system status. However, these data can be sent after some of the events, but not all. Consider this string. ABCDEFGHIJKLMNOP The first character and last could include all data created at the originating device. All characters between could include a common character that is encrypted and does point back to the creation of the string as "known to the Operating System" (and congruent to the lead biometric and the final trailing biometric and other data) which created the string, but is greatly reduced in size. Hence the recipients system can confirm to the recipient, all data was associated with a known, verified biometric and this confirmation would thus include character by character authenticity w/multibiometric confirmation. Audits, both manually called for and automated, will happen from time to time and one great example to form a very solid, very trusted system is to allow an artificially intelligent program to perform audits using all unused bandwidth in the systems and in their connecting networks when its less expensive or when there is less competing traffic.

In an embodiment, during transmission, analysis of any element in the data stream results in increase of bandwidth or high priority routing and rerouting. Note that identification of the user is performed using a combination of the source address (if any) and then the actual data stream content, which contains considerable unique identifiers. Increase or decrease in bandwidth, speed, performance, quality of service (QOS) may preferably be automated based on what the user is willing to pay for their access to the network.

In an embodiment, device to device remote control, a feature discussed in the original specification for U.S. Pat. No. 9,065,893, still stores the biometric data and when the broken device is restored. Upon restoration, the formerly broken device will have the biometric data and all other data in its data base. Both devices will have record of all the events so a forensic analysis will know the scenario was a remote control scenario. Nothing stated herein will limit this feature to the extent that should a user find a benefit, one device, in an embodiment, remote controls several at the same time, or chain remote control devices. Users who invest in costly software can access the software if it's a one instance only software, using this specific feature, where they create the data needed from the costly software and then communicate it back to the device from where they are chain accessing the device containing the costly, one instance software. Chain means establish connection to a device, note that the devices sees others on its network and then, one may hop further and further, controlling devices with solid data connections in a chain like manner. All is recorded, so the risk is mitigated and users may find utility, even if it's just to turn off sound to keep a home quiet. Hence one operating system must recognize when the main device in which it presides, falls under the control of another (which will obviously require user approval per settings and perhaps some extra security measures such as a password or capcha or combinations of these). Future automation of the steps taken in establishing a connection, changing a setting, chaining into other devices and changing their settings may preferably, in an embodiment, be converted to a single action type feature, eg a button to press. Much like the data entry line in a search engine which tries to recall what you have typed recently in that space to aid you in filling the data so you can hit search, the device to device software could perform the same task for users.

In an embodiment, there are many systems made mostly of sensors. Stores marking their merchandise with RFID or NFC type devices represent one example. This technique is being wrapped into the IoT (Internet of Things). Adding the technology of U.S. Pat. No. 9,065,893 to any sensor which can host a pixel stack benefits from this tech on every sensor, allowing instant compatibility with the whole of this invention series. All actions for all users are recorded, forever. They may be forensically analyzed. The inventor also foresees a World of Things (WoT) wherein, identification of an object and its proper use, manipulation, installation, deinstallation, repair, maintenance and so on, is known to a central or mobile data base and hence, to the device I carry. Because this knowledge goes beyond the internet and can be called upon through any network, including private or proprietary, the term WoT is born. A universal standard for all things which can work compatibly with the IoT but carries vast benefits over the IoT. An example is a company deciding to automate all of its inventory processes wherein it wants to tag all items in a manner in which they may be queried even down to the precise juxtaposition of how the item is stored. In developing this program, the company custom programs many attributes and finds its data base and method is not compatible with the IoT standards, but a software program can be written to convert their data base into a format that is IoT compatible. Because their own custom data base is of value to them, the concept of WoT prevails as it allows for custom, one off type designs to accomplish a deeper, broader capability that would have found limits if the IoT was the only way to implement the inventory management system. Say a stored item is required to be stored on side A and many are sitting on their other, different sides. An IoT solution may not be able to tell. A WoT would because its not limited to standards or one sensor per item. This concept can add desirable features to home controls, appliances, vehicles, weapons, electrical controls (each where a sensor is the primary item to be affixed to and made a part of a given object in question, such as an electrical outlet, a light switch, a light fixture). Developing extreme versions of sensors with redundancy, direction and juxtaposition sensing can allow for standardized or custom marking of objects. A very good example is drawn from mechanical systems which can include compressors, engines, motors, generators, transmissions, wherein, each least common denominator part is tagged with sensors to tell the user who wishes to perform any task such as disassembly, re-assembly, testing, trouble shooting, maintenance, precisely how to proceed. If a small item such as a screw or washer is involved, the next least common denominator component the removal of the screw or washer encounters either before or after, bears the sensor to identify the type of screw, washer etc. . . . and precisely how that item is supposed to be placed and torqued. This is why the term WoT applies better. No internet is necessary for the suggested system to be implemented from advanced features. Under a heavy application of these teachings, the biometrics are known for those who have ever worked on a given engine, for example. The query of forensic data from that engine reveals those who did not properly analyze or work with the engine in the past. Or it could serve to warn the next mechanic of irregularities in the system, as the owner may not want to pay to figure out each irregularity. Each individual who addresses a given system is remembered by that system and its components. This can happen absent the internet, hence the term WoT is suggested.

In an embodiment, the concept of Capcha is revolutionized as the near end (my device) can assure the Capcha is solved by "me" and not some other user. My end only needs to assure the Capcha software the user was the normal user for the device. Or, the concept could be taken further and my biometric identity could be passed to the machine posing the capcha or the client using the machine posing the capcha who wanted this extra protection from BOTs and public enemies. Once the complex Capcha is completed successfully, given all the other data in the metadata stream, the Capcha complexity can be reduced further and further so long as the other metadata remain static as a function of time.

In an embodiment, BOT resistance end to end is added which will effectively identify bots quickly by using a loopback concept. A special data set (unique) is sent to the device connected to the application which the device is then instructed to loop back to its connection. Sending to the device can be in band or out of band. The data set can be any unique identifier and might include the biometrics of a manual testing technician or an encrypted data set of any other data set which assists in identification of a bot emulating an attached device. For example, in other embodiments, the loop back signal of this embodiment is joined by other data from the device and other devices local to that device. A bot could only know and then imitate that data if it were literally running in the remote device. It is to be remembered, biometrics may automatically ride along with this test mechanism and that includes biometrics from surrounding devices. Again, a bot performing emulation to evade detection would have to know the biometrics of the surrounding devices. Surrounding devices, in an embodiment, also beacon out some or all encrypted data to further thwart bot emulation. It would be of interest to develop a capcha asked of other devices, not just the user. The other device, not being the user's sees this as an optional request to help cut down on hacking and bots. Some will agree, some can use an auto fill which then at least provides the other device biometrics automatically, without disturbing the otherwise unrelated user.

In an embodiment, forensic analysis us enhanced for finding suspected bots, determining their signature and then eliminating their access. Examples include real time and historic review of all data coming from a specific device to search for overuse of any facility that appears suspicious. In this new invention series, capcha is almost eliminated as is logging and providing a finger print. As such, any bot attempt will likely be done as a pseudo device and when a device tries to hit facilities too many times, it becomes suspicious. Consider, the bot has to have data from any loop back, the timing of the loop attempt tells if its a bot, lack of data or incorrect data from surrounding devices in proximity to the primary device is also a suspicious give away.

In an embodiment, automatic limiting of a given service based on abuse will be an interesting program to implement. Abuse can be bots. Slowing the pace and prompting for capcha will re-certify its a genuine user. In the terms of service, we can call or text the user to inquire as to why they hit hit hit a service. As we learn our user's preferences and variables we can get rid of the capcha frequency and open up more services to one or groups of devices, or if we see the behavior is likely to be emulated by the masses, I alter our programs to allow better service but provide our protection from bot slamming or data hack attempts.

In an embodiment, I offer new forms of encryption enabled by the multibiometrics and the structure proposed herein which is previously mentioned Here, I would simply add that the various techniques discussed elsewhere might preferably be applied to the multibiometrics to be used in the loop back test for bots. This is due to the system knowing its own encryption mechanism and when a multibiometric returns from a loop trip, it had better time out to the network and its native traffic, and then, the decrypt should take a known about of time and also pass. This means decrypt, show a plausible or precise value depending on what was expected and then the timing of the decrypt cycle has to match known metrics.

Tokens sent to the device either in band or out of band can be fake. The device knows when a token is real because the location is encrypted into the token, so the device can see tokens directed to it, to repeat back. Device has to interpret all tokens, decrypt and then respond with the correct token plus in the meta data stream the location of the device, devices local to the device, transactions location to the device and other activities, such as various users accessing apps, all add to the metadata. This allows intelligent monitoring (artificially intelligent) software to flag device activity that appears to be a hack or a bot. Data appearing in the metadata or data missing from the metadata assists in flagging the data stream to the device in question. Initial connection for a given transaction can depend on this process.

In an embodiment, transportation systems commonly referenced as networks are proposed to be redesigned with this technology so the passing of metadata leaves a trace with each least common denominator machine (router, switch) allowing for later query about a given data stream. To conserve space, this information is eventually deleted but prior to deletion, it may be recorded to a larger storage device for recovery. The last piece of data deleted might be the knowledge of a communication, the biometric identity of sender, receiver and that the receiver received the data. This allows for a forensic recovery of data transmission and reception far beyond what is available today. Eg Biometric trace. Biometrics of interest can be given priority and bandwidth automatically, for law enforcement to maintain a continuous trace. Children could wear glasses, shoes, clothing, which are tagged and access locally through NFC (RFID, near field methodology) any device which can then re-transmit the data. The novel idea of providing bandwidth for emergencies based on the biometric identity found in a metadata stream will find many uses. Military uses certainly come to mind, as well as medical emergency and disaster recovery.

In an embodiment, a biometric and Multibiometric search engine function is very clearly needed to facilitate all higher level searches and inquiry (either by multibiometric, or, object last known to have been handled by or in proximity to a given multibiometric). As such, having any and all components of this disclosure report to a search engine content device, which associates the biometrics with a unique user plus device ids, locations etc, is implied and needed to pinpoint information about past or real time communications. This allows for a real time location capability for finding lost people, kidnapped people, or people of interest. Eg law enforcement. A kidnapped child touches a juke box. That action causes a pathway to public networks, the identity of the child, location, even spectral acquired blood chemistry is passed. As the metadata stream passes through various routers its priority is known and as such, routing in real time occurs for this vital path. "Search" as a concept can now undertake "group search" to check, for example, if a specific grouping of objects can be found, tested or checked for compatibility (rev level) and then shipped and received in time to meet a given mission time frame. Currently, this requires search for each item, independently, as well as with the communications until a communications tree can be established. With this embodiment, grouping of items and communications to reach same, can be formed in one action. Interestingly, with high priority, all pathways for communications are given the higher priority so a "busy" or low latency, slow network etc. . . . is not encountered, endangering the mission in question. To endow a public network with these capabilities alters the network functionality to serve other stakeholder interests, such as government, institution, emergency services etc.

In an embodiment, dark processing, dark data handling (using dark components) has been a constant subject which the inventor carries forward to further enhance and discuss. Hence, all previous mentions in the above publications and patents are carried here, where the argument is added that multibiometrics may be used in conjunction with previous disclosure about dark processing with great success. This basically discloses that the initial fire up of a given dark component, processor, switching component, storage, network, memory, will include a verified multi-biometric from a unique user. Mandating that this unique user is required to be present or available to then address certain specific attributes of this dark component to access them, to change them, to update them, mandates the confirmation of a multibiometric from that unique individual.

In an embodiment intended to permeate all of this disclosure, one unique user's biometric is used to pair with another such that there is responsibility and ownership created for a given action one or the other user wishes to take. In such a setting, one of the two should be required to identify themselves as the asking party, the other (party or more than one other, a plurality) should identify themselves as witness or additional confirming parties, not prime parties.

In an embodiment, static grasp over longer periods will generate multibiometrics which include a time lapse data element. This is but one example of a "hyperbiometric", multibiometric with even more weight or certainty than a single event biometric, such as finger print scan, or even a Multibiometric of this invention. Users repeatedly using such devices slowly builds up hyperbiometrics and a weighting or scoring of certainty as to the identity of the user. Weighting and scoring can happen in a device, but it will now also happen in networks, clouds, every element of computing, so each element can decide if a new request, if a new communication carries an even higher probability of identity being known for the user making the request. These events need not bar or block the user, but they may serve to flag the event for human eyes to double check for identity and certainty of the transaction's validity. Automation again comes into play. Automatically, software can set biometric certainty to where it must exceed a threshold to allow the transaction to pass, or to allow the transaction but mark it a certain way. Levels of security can correspond to levels of marking, for example, there may be 10 levels of security wherein, as transactions occur over a 24 hour period, each transaction gets a score of 1-10 and that score reflects certainty as to the user's identity as assured through multiple uses of their device, and biometric (and multibiometric) over that 24 hour period. The time frames can be variable, such as hourly, 24 hour, yearly and so on. Any given system can thus assure its trust factors by adjusting these variables to either bar transactions or flag them. If there are no moments the device is exposed to no biometric present or a foreign biometric (foreign biometric simply means a new biometric not seen by the device). At some point, a video, which is slides of time all assumed to relate to one another in that they were taken in precise succession, can represent a multibiometric and when sizable, a hyperbiometric. To assure protection of storage space a hyperbiometric created by a video may be self parsing or self deleting. These are typically user settings but the engineers involved in developing apps will have the same controls to assure systems perform without unacceptable latency.

In all embodiments of this invention series, artificial intelligence will assist in detecting anomalies. One such idea is to deeply embed in the operating system a check for logic, could user X with biometrics known to be associated with user X, possibly be at location Y at moment ZZZZZZZZ (date/time) in light of all other information known? These forms of logic tests may traverse all data and biometrics known to the overall system and may also rely on remote stored biometrics, search engines equipped to recognize the biometrics and the identity of the owner of the biometrics. What is done with a rejection or issue with a data event can be programmed into the operating system, the service, software or app in question. Certainly, this will have at least some implication for law enforcement and government.

In an embodiment, now that ownership of data is so marked that the unique user who created each keystroke and the time/date/location may travel with this data, it may be of interest to build systems which check data as it is sold, mined, used by other sources. This has very broad and obvious implications for protecting one's copyright on music, images, videos, type written ideas, poems, lyrics, inventions. Hence, users finally have recourse to track their own personal data because the data reaches back to them for confirmation that the party in possession has permission to this data. Because each transfer of data bears all the features of this invention, the forensics are present to track each data share, mine, transfer to the source who may have violated the rights of the original user. In very complex example, an inventor, working alone, develops a specification and has a patent agent file the invention. Since each character bears the inventor's identity by way of multibiometrics, should anyone have intercepted and misused the data, the patent office in question and the inventor, with the help of the present invention, can be automatically warned.

In an embodiment, QEDs (Quantum Entanglement Devices) are deployed in the devices of this invention in order to mark data and provide confirmation that data in the data stream was not interfered with or intercepted, hacked, replaced, or altered, leaving the device wherein the data returns to the device (such as emitting light to then collect it as a device will do when performing night vision functions) which can mean a whole image captured by one of these devices can then be sent across a network with all the other features intact, wherein, the recipient knows who acquired the image AND that the image was not altered between device and target. Confirmation that the image has not been altered once sent across a network can be further protected with QEDs but the QED signal must be carried by that network. The fact that a device QED verified the authenticity of an image capture can be proven across a network at a final destination without the use of QEDs.

In an embodiment, characters to be sent in a metadata stream are superimposed with the biometrics because the biometrics are larger and more complex, usually in the form of an image. Whatever biometric data is lost when a character is superimposed on top does not matter because the remaining pattern is still utterly unique and can be identified at the receiving end. Hence, the character is proven not to have been altered end to end, because the biometric data blocked out and lost (covered/deleted) forms a pattern within the biometric pattern. Picture a perfect L shaped hole in a cotton ball so precise, you can determine type face, font, character size and that BOLD was applied. The cotton ball is a 3-d multibiometric. Now it is possible to visualize very well, how a multibiometric and its associated character can be combined and sent across a network, where the receiving end knows the character is married to a specific user and the character itself could not have been altered. The complexity of the multibiometric makes this possible. No matter what character you apply to the multibiometric, it cannot delete or eliminate enough information to nullify the ability to identify the multibiometric as being from USER X.

In an embodiment software methods used to develop web sites are implied by using the term "software". As such, in a very useful example, any one post by a person of interest could trigger an alarm to law enforcement and automatically provide open bandwidth so tracking of the source is continuous and uninterrupted. This happens because the post carries a multibiometric and that multibiometric identifies a unique individual plus any other data arriving in the metadata from the person of interest.

In an embodiment a multibiometric cursor control and multibiometric click passes my identity to the service or application I am using just through movement of a cursor controller or, any action such as click. This vastly improves the tracking of who visited any web site or posting and perused, and in what manner they perused the data. If peripherals are deployed, they can have pixel stack surfaces to pass some multi-biometrics along, enough to identify the unique user. This means stylus, remote keyboard, mouse, track pad and the like.

In an embodiment, use of biometric tagging along a timeline, assists in forensic analysis of the object in question. For purpose of interpreting this embodiment, the object could be a section of computer coding, wherein one original writer wrote the code, others have used it and one writer in the mix, found an error and corrected it. In embodiments, all of the aforementioned is deciphered by searching on the block of code or the original writer, leading back to the block of code. The idea of biometrics being associated with objects, videos, images, posts, communications, for each viewing or each re-send or forward, adds to the forensic dissection powers as the time, date, location and device ID come into play.

In an embodiment, ownership of actions as relate to a tagged item, wherein the actions can be stored in a user's device and in the object in question, form a new technology, a forensic ability to reverse engineer and reverse track all work done by all users (people) on all machines equipped as aforementioned. In example, a user disassembles a laptop computer and reassembles it using 2 replacement parts. In embodiments, software is deployed to record with all specificity (where, when, who was present, how long it took, what mistakes were made) the events of disassemble and reassembly. There are an unimaginable plurality of machines, appliances, systems which will benefit from this level of scrutiny. Equally, training and retraining of engineers, mechanics, technicians can take place automatically. If an improvement is generated by an individual, it is able to be identified to that individual and then distributed to all such individuals who would benefit from knowing the new step, improvement etc. . . .

In an embodiment, single biometrics are distinct and different from multibiometrics in that a single biometric is a species of biometric, such as a finger print, while a multibiometric is at least two biometrics superimposed as they are found at the moment they are taken. (in situ, as is) These date, being present in metadata, are new to the world of computing and networking, as well as cloud computing. As such, any source of information fed to a search engine data base will now benefit from the inclusion of biometrics, and independently, multibiometrics so the search function can focus on biometrics of "X" and multibiometrics of "X", a given user.

In an embodiment, the biometrics and multibiometrics within a data stream may be further encrypted. For example, embedding time, date, location into the multibiometric itself, when decrypted at the receiving end, must match the exterior data of time, date and location which was present in the same metadata stream. This concept is not limited to time, date, location and may contain any information the sender's device can encrypt into the biometric or multibiometric elements of a given metadata stream. This super hardens the overall systems and networks attempting to be more secure than any other known methodology. Arguably, a simple text from one cell phone to another, using all the techniques described herein, becomes identified to the recipient, not by sender's name which only means someone had the sender's device and found it logged in, so they could send a text. It means the sender passed biometric scoring for each keystroke, multibiometric scoring for each keystroke, data from surrounding devices also passed through, and all the critical data were sent yet again, within the multibiometrics received at the receiving device, thus assuring the text received is at least 80,000,000,000,000 times more secure than if the sending device merely has a finger print scanner. This mathematic phenomena happens because the biometrics are creatively used and reused in stages, not just to get into a device or an app (eg logging), from beginning to end of process.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications. As an example, the use of two different user's biometrics (or more than 2 users) can still be associated with a single action. This is a design question when creating an application or writing software. The biometrics would be ordered so as to be able to determine the actual keystroke owner(s) and the oversight of the keystroke owner. (keystroke owner means the person who actually creates the entry or event. Oversight is management who accepts responsibility for the keystroke owner and thereafter, their biometrics will be associated with the keystroke owner's biometrics ordered and identified for future use in heightening security and tracing events, assuring accountability. Threads are anticipated, meaning, C responsible for B responsible for A in any depth necessary for a given mission) In an environment where productivity is rewarded directly to the individual in question, such a feature as this is essential for forensic tracing back to the original "creator" of a step, process, thought etc. . . . . . This is but one example of a combination of permutated automated features drawn from the teachings of these specifications.

I claim:

1. A mobile communication device receiving a biometric input transmitted through a protective exterior surface covering an array of multilayer pixel stacks comprising a biometrically enabled operating system wherein said operating system when enabled performs operations comprising:
controlling an input/output device capturing at least one biometric for an action taken by a user;
forming, on said exterior surface, at least one interface selected from a list of: a keyboard, a keypad, a plurality of functionally-related keys or buttons, a key or a button; wherein, said protective exterior surface is refracting and said operating system further perform;
detecting light deflection caused by pressure of a finger depressing said refractive region of said protective exterior surface;
tracking the location of the communication device and other devices in proximity to the communication device;
storing said biometric in combination with said location, location of said other devices in proximity and trust factors collected from metadata streams of said other devices;
grouping said pixels in a given stack;
sensing, with capacitive, inductive or optical sensors associated with at least one said stack;
correlating input species, to detect an external event;
deploying multiple types of sensing in a stack;
changing, when sensors do not agree, from inductive and optical sensing to capacitive and optical sensing in that stack, for that specific form of sensing, or combining more than two species of emission and detection.

2. The mobile communication device of claim 1 wherein said communication device is selected from a list including stationary microprocessor controlled devices, completely virtual computers which function as part of a cloud, servers, peripherals, vehicles, watches, advanced contact lenses, optical devices selected from the list comprising telescope, microscope, military apparatus, control stations, flight monitors, 911 center consoles, power station controls, virtual reality goggles, kiosk screens, media walls and holographic logic and wherein said action pertains to identification, secure transactions, and other user-oriented services.

3. The mobile communication device of claim 1 wherein said capture of said biometric is passed to internal memory of communication local device, other paired devices or outside the communication device to and through networks (eg metadata streams), to clouds.

4. The mobile communication device of claim 1 wherein said action taken by a user includes a gesture at a distance.

5. The mobile communication device of claim 1 wherein said biometric includes a first biometric and a second biometric co-associated with said first biometric via a known region or during a known moment in time.

6. The mobile communication device of claim 1 further comprising data about the known location of the communication device (gps or wifi assisted) and known location for at least one said other device.

7. The mobile communication device of claim 5 wherein said multi-biometric comprises a finger print and capillary pattern or bone structure of said finger collected in a single pass, "clock cycle" or "layer cycle."

8. The mobile communication device of claim 5 further comprising spectral analysis, a kirlean still, nervous system analysis or video analysis of said finger.

9. The mobile communication device of claim 5 further comprising a connection to a plurality of component communication devices, each using the biometric or multi-biometric data in a metadata stream to glean useful information from a point of transmission to a point of reception or storage for receiving a biometric input.

10. The mobile communication device of claim 1 wherein said digital signal processing unit interprets the degree to which said finger deforms said protective external surface as pressure.

11. The mobile communication device of claim 10 further comprising a unit to interpret movement of the finger such as drag and press harder, touch and trace a circle, touch and trace a square, touch and trace a triangle, static grasp, touch and twist or haptic control as a control which passes a biometric or multi-biometric.

12. The mobile communication device of claim 1 wherein said light consists of electro-magnetic emission beyond the visible spectrum, collected through a reflected signal in differing layers.

13. A method comprising:
receiving a biometric input transmitted through a refracting exterior surface display connected to a multilayer pixel stack, said display being in communication with an operating system, wherein the operating system performs steps of:
controlling an input/output device capturing at least one biometric for an action taken by a user;
forming, on said exterior surface, at least one interface selected from a list of: a keyboard, a keypad, a plurality of functionally-related keys or buttons, a key or a button;
wherein, said protective exterior surface is refracting and said operating system further performs:
detecting light deflection caused by pressure of a finger depressing said refractive region of said protective exterior surface;
tracking the location of the communication device and other devices in proximity to the communication device;
storing said biometric in combination with said location, location of said other devices in proximity and trust factors collected from metadata streams of said other devices;
grouping said pixels in a given stack;
sensing, with capacitive, inductive or optical sensors associated with at least one said stack;
correlating input species, to detect an external event;
deploying multiple types of sensing in a stack;
changing, when sensors do not agree, from inductive and optical sensing to capacitive and optical sensing in that stack, for that specific form of sensing, or combining more than two species of emission and detection.

14. The display of claim 13 further comprising a chip.

15. The display of claim 14 wherein said display resides on a surface of said chip.

16. The display of claim 14 wherein said chip is loaded with accessible software, at least a portion of said access software being inaccessible to external communication until said at least one biometric is captured.

* * * * *